Jan. 16, 1940.  B. H. FREEDMAN  2,187,685
THEATER TICKET
Filed Oct. 21, 1939
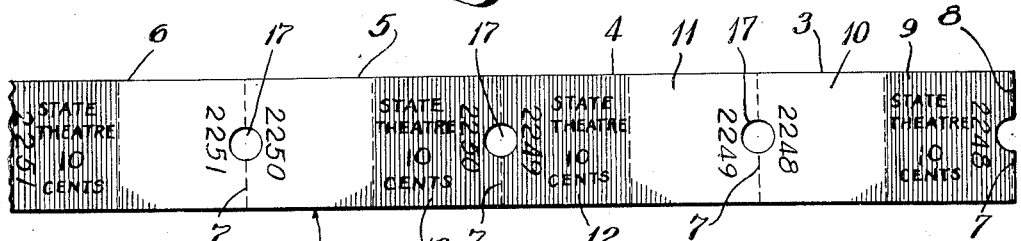
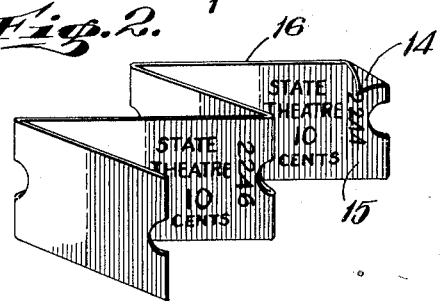
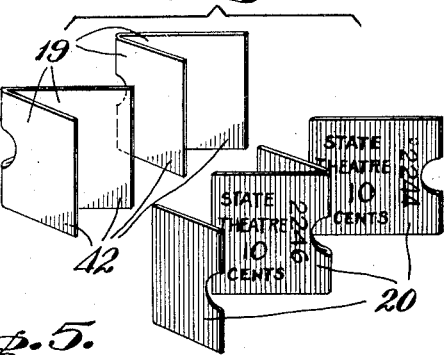
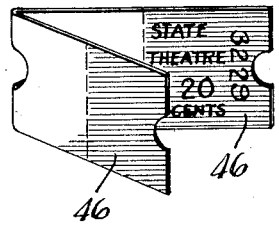
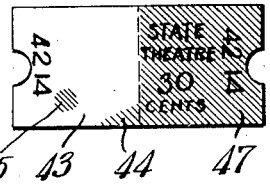
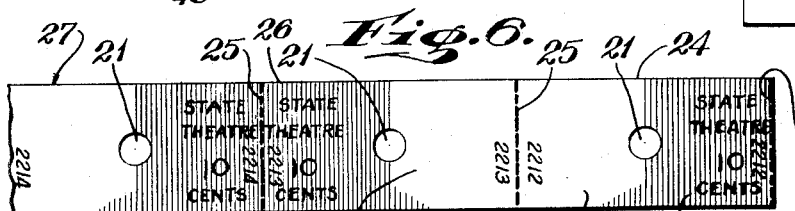
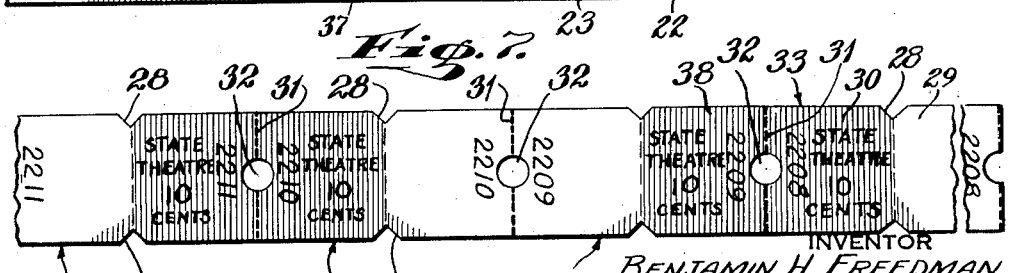
INVENTOR
BENJAMIN H. FREEDMAN
BY
ATTORNEY Patented Jan. 16, 1940

2,187,685

UNITED STATES PATENT OFFICE 2,187,685

THEATER TICKET

Benjamin H. Freedman, Asbury Park, N. J.

Application October 21, 1939, Serial No. 300,499

10 Claims. (Cl. 283—53)

This invention relates to an improved theater ticket to facilitate checking such tickets as they are collected, to facilitate checking the value of the same, and to facilitate insuring the admission of the proper ticket holders, as in part disclosed in my prior application for Patent Serial No. 293,169, filed September 2, 1939.

Among the objects of the present invention it is aimed to provide an improved ticket whereby certain types of well-known fraud or peculation accompanying the collection of theater tickets is effectively eliminated. As an instance, in theaters especially of the type having large blocks of seats that are not reserved at a common price, where the practice prevails for the ticket collector at the door to collect the ticket, tear it in half into at least two stub areas, drop one-half or one stub area in the ticket chopper for the accounting department, and return the other half or stub area to the patron to show upon request that he is entitled to admission, a common form of fraud is characterized by the ticket collector retaining the half ticket of a previous patron instead of depositing it in the ticket chopper, and upon receiving the ticket of the following patron, merely handing such latter patron the previously retained half, and then instead of tearing the newly acquired ticket in half, conspiring with the ticket seller to resell the same and pocket the proceeds. According to the present invention, the two halves of the tickets used are marked to distinguish one from the other, whereby the half to be returned to the patron cannot be interchanged with the half to be deposited in the ticket chopper.

It is still another object of the present invention to provide not only an improved ticket to facilitate preventing dishonest practices such as the aforesaid, but also to provide an improved ticket to facilitate aiding the accounting department in quickly grouping and counting the stubs or halves of different priced tickets. As an instance, in some theaters, while the individual seats may not be reserved, still it is customary to charge a higher price for the seats located in the loges and boxes than for the seats located in the orchestra, and still furthermore, especially with moving picture theaters, the practice now prevails to charge different prices for the admissions during different parts of the day, as an instance, a low price for admissions up to 2 p. m., an intermediate price for admissions between 2 p. m. and 6 p. m., and a top price for admissions between 6 p. m. and the closing hour. According to the present invention, the ticket stub intended for the patron cannot be interchanged with the stub to be deposited in the ticket chopper, and the stubs of the differently priced tickets deposited in the ticket chopper are so distinctly marked from one another that the accounting department can quickly sort them into groups of common value, thereby facilitating the work accompanying the sorting and counting of such ticket stubs.

It is still another object of the present invention to provide an improved ticket characterized by a strip of successively adjacent tickets marked so that when one or more, and especially more than two, are dispensed, the tickets can be folded into a group equal in length to that of a single ticket or fan-folded by the attendant, and then torn in half into their respective stub areas when the halves or stub areas to be retained by the patrons will all lie adjacent one another in one group, and the other halves or stub areas to be deposited in the ticket chopper will all lie adjacent to one another in another group.

It is still another object of the present invention to provide an improved ticket characterized by a strip of successively adjacent tickets which can be severed from the strip, either one at a time or two or more at a time, in accordance with the prevailing practice, each of which tickets on the strip are divided into two distinctively marked stub areas on both faces of the ticket, and at least on one face of the ticket with the like marked areas of two succeeding tickets adjacent to one another, so that when folded into a group equal in length to that of a single ticket or fan-folded by the attendant, the stubs or areas of one marking common to one another will all lie back to back in one group, and the stubs or areas of the other marking common to one another will all lie back to back in another group.

These and other features, capabilities and advantages of the invention will appear from the sub-joined detail description of specific embodiments of the same illustrated in the accompanying drawing, in which Figure 1 is a fragmental plan of a ticket strip made according to one embodiment of the present invention;

Fig. 2 is a perspective of the ticket strip fan-folded;

Fig. 3 is a perspective of a fan-folded ticket strip after it has been dispensed and torn in half into its separate stub groups by the attendant;

Fig. 4 is a perspective of a differently colored ticket made according to the present invention;

Fig. 5 is a plan of a ticket of still another color made according to the present invention;

Fig. 6 is a fragmental plan of a ticket strip made according to another embodiment of the present invention;

Fig. 7 is a fragmental plan of a ticket strip made according to still another embodiment of the present invention; and Fig. 8 is a plan of a single ticket made according to still another embodiment of the present invention.

In the embodiment shown in Figs. 1, 2 and 3, there is provided a ticket strip 1 consisting of a plurality of tickets 3, 4, 5 and 6, defined from one another by the dotted lines 7. When these tickets are dispensed by a machine such as illustrated in Letters Patent No. 2,103,720 dated December 28, 1937, of R. H. Helsel, depending upon the tickets sold to a purchaser, one or more tickets are dispensed in an attached row and severed from the supply roll by the knife of the dispensing machine cutting substantially along a line 7. The edge 8 defines the cut made when dispensing the last ticket not shown. If a single ticket were next dispensed from this strip 1, the next severance would be along the line 7 defining the tickets 3 and 4 from one another.

One of the outstanding characteristics of this ticket strip 1 resides in the fact that the area 9 of the ticket 3 is predominantly of one color shown as red in Fig. 1, and the area 10 of the ticket 3 predominantly of a color distinct from the color of the area 9, as an instance, white. The area 11 of the next succeeding ticket 4 is of the same color as of the area 10 of the ticket 3, and the other half or stub area 12 of the ticket 4 is shown as predominantly red or of the same color as the half or stub area 13 of the ticket 5, and so on.

Preferably as shown in Fig. 2, the stub areas are of the same color or marking on both faces, see for instance the color of the turned-over edge 14 being colored red, the same as the color of the area 15 of the ticket 16.

In the embodiment shown in Figs. 1, 2 and 3, to facilitate feeding the tickets through the dispensing machine, the holes 17 are provided.

It will appear from Fig. 3 that when the ticket collector has collected a group of four tickets, and torn the same into two groups of stubs, the stubs 19 predominantly white in color will be grouped together back to back, and the stubs 20 predominantly red in color will be grouped together back to back.

Preferably, the stubs 19 will be deposited in the ticket chopper with the major portion of the printed matter including the name of the theater, as an instance, on the stubs 20 handed to the customer, for publicity purposes and the like, while the stubs 19 predominantly blank and free from printed matter may be reserved for accounting notes and the like of the accounting department.

If the method described using the present invention is introduced, it will be seen from the aforesaid that fraud can be quickly detected if the ticket collector should attempt to retain the red stub portions 20 for the purpose of interchanging them with the next group of tickets handed in at the door, either by a watcher at the door, or due to the fact that the patrons as a rule drop the stubs returned to them onto the floor of the theater and the inspector or sweeper inspecting the floor after the closing hour, due to the color, could quickly detect if any of the white stub portions were returned to a patron and dropped on the floor of the theater in accordance with the practice prevailing.

To aid the ticket collector in tearing the tickets in half, the ticket strip, see Fig. 6, could have the feed pin receiving openings 21 formed on the dividing line between the two stub areas 22 and 23 of a ticket 24, as an instance. Prepared lines such as the perforated lines 25 define the tickets in a strip from one another, in Fig. 6, as an instance the ticket 24 from the ticket 26, and the ticket 26 from the ticket 27, to facilitate folding the strip of tickets into a group equal in length to that of a single ticket.

In Fig. 7 the ticket strip is provided with notches 28 at the ends of the line defining the stub areas 29 and 30 as an instance from one another, and the prepared lines such as the perforated lines 31 with the feed pin receiving holes 32 intersecting such lines 31, defining the successive tickets from one another, as an instance the ticket 33 from the ticket 34, the ticket 34 from the ticket 35, and the ticket 35 from the ticket 36. In addition, the blank stub area 29 in this embodiment is in advance of the printed area 30.

In both of the embodiments illustrated in Figs. 6 and 7, it will appear that the main characteristic of the embodiment is illustrated by the adjacent stub areas of successive tickets being like in color, as an instance, the adjacent stub areas 23 and 37 of the successive tickets 24 and 26 of the embodiment illustrated in Fig. 6, and the adjacent stub areas 30 and 38 of the successive tickets 33 and 34 of the embodiment illustrated in Fig. 7.

In Fig. 8, the ticket 39 there illustrated shows the printed matter extending across both the stub area 40 to be retained for the ticket chopper, and the stub area 41 to be returned to the patron.

If the tickets for the morning session before 2 p. m. as an instance are sold at the low price, ten cents, the color of the stub areas turned over to the patron may be red, as indicated in the embodiment of Figs. 1, 2 and 3, then the stub areas of the strip for the session between 2 p. m. and 6 p. m. to distinguish therefrom, as illustrated in Fig. 4, may be blue in color as at 46, and sold for a higher price, say twenty cents, and the stub areas of the strip for the session between 6 p. m. and the closing hour, to distinguish from either of the lower priced tickets, as illustrated in Fig. 5, may be green in color as at 47, and sold for a still higher price of say, thirty cents.

To aid the accounting department in selecting and sorting stub areas of the differently priced tickets, the stub areas 19 as an instance of the embodiment shown in Fig. 3, may have a distinctive marking 42, red in the instant case, to correspond to the color of the stub areas 20.

On the other hand, the stub areas to be retained for the accounting department such as the stub areas 19 of Fig. 3 alone may vary in color to correspond to a variation in price for successive sessions, or these stub areas 19 alone may have a marking such as the marking 42 varying in color or other characteristic to correspond to a variation in price. In the latter case, the color of the stub areas 20 may be the same for the various priced tickets.

As indicated in Fig. 5, the stub area 43 to be retained for the accounting department may have any distinctive mark to classify it as belonging to a ticket of one price range such as the triangular colored portion 44 or the circular mark 45, or both. Furthermore, these marks or group of marks may be selected to define the price either by the color or by the conformation or grouping of the mark or marks 44, 45, or the like.

It is obvious that various changes and modifications may be made to the details of the present invention without departing from the general spirit thereof set forth in the appended claims.

I claim:

1. A ticket strip having a succession of tickets, each divided into two stub areas distinguishably marked one from the other with the adjacent stub areas of successive tickets of like marking.

2. A ticket strip having a succession of tickets, each divided into two stub areas in colors different one from the other, with the adjacent stub areas of successive tickets of like colors, and a colored marking on one of the stub areas corresponding to the color of the other stub area.

3. A ticket strip having a succession of tickets, each divided into two stub areas in colors different one from the other on both faces of the stub areas, with the adjacent stub areas of successive tickets of like color, and a colored marking on one of the stub areas corresponding to the color of the other stub area.

4. A ticket strip having a succession of tickets to be dispensed either as single tickets or as a succession of attached tickets, each ticket divided into two stub areas in colors different one from the other, with the adjacent stub areas of successive tickets of like color whereby when fan-folded and torn into their respective stub areas, the stub areas of like color will be grouped together and back to back.

5. A ticket strip having a succession of attached tickets to be dispensed either as single tickets or as a succession of attached tickets, each ticket divided into two stub areas in colors different one from the other, with the adjacent stub areas of successive tickets of like color, and a feed pin receiving opening between the stub areas of each ticket to facilitate tearing the tickets into their respective stub areas.

6. A ticket strip having a succession of attached tickets to be dispensed either as single tickets or as a succession of attached tickets, each ticket divided into two stub areas in colors different one from the other, with the adjacent stub areas of successive tickets of like color, and notches at the edges of the tickets between the stub areas of each ticket to facilitate tearing the tickets into their respective stub areas.

7. A theater ticket strip consisting of two or more theater tickets defined from one another by a line to facilitate folding the strip into a plurality of tickets face to face, each ticket having two stub areas distinguishable one from the other by a marking, the adjoining stub areas of successive tickets having like markings, so that when folded like stub areas of a group may be torn from other like stub areas as a group simultaneously.

8. A theater ticket strip consisting of two or more theater tickets defined from one another by a line to facilitate fan-folding the strip into a plurality of tickets face to face, each ticket having two stub areas distinguishable one from the other by color, with all of the stub areas of the strip succeeding one another end to end and the adjoining stub areas of successive tickets having like colors so that when fan-folded and the group of tickets are torn into their separate stub areas, all of the stub areas of one kind may be torn from the other stub areas as a single group simultaneously.

9. A theater ticket strip consisting of two or more theater tickets defined from one another by a perforated line to facilitate fan-folding the strip into a plurality of tickets face to face, each ticket having two stub areas, one predominantly blank to be retained for the accounting department and of one color, and the other stub area containing printed matter to be handed to the patron and of another color to be distinguishable from the blank stub area and also to define a certain price, with all of the stub areas of successive tickets having like colors so that when fan-folded and the group of tickets are torn into their separate stub areas, all of the stub areas of one kind may be torn from the other stub areas as a single group, the blank stub areas having a colored marking corresponding in color to the color of the printed stub areas associated therewith to aid the accounting department in grouping the blank stub areas of like price.

10. A theater ticket strip consisting of two or more theater tickets defined from one another by a prepared line to facilitate folding a strip into a plurality of tickets face to face, each ticket having two stub areas distinguishable from one another by different markings, one stub area to be retained for the accounting department and the other stub area to be handed to the patron, the marking of the stub area to be retained varying according to the price of the ticket, with all of the stub areas of the strip succeeding one another end to end and the adjoining stub areas of successive tickets having like markings so that when folded and the tickets are torn into their separate stub areas, all of the stub areas of one kind may be torn from the other stub areas as a single group simultaneously.

BENJAMIN H. FREEDMAN.

DISCLAIMER 2,187,685.—*Benjamin H. Freedman*, Asbury Park, N. J. THEATER TICKET. Patent dated January 16, 1940. Disclaimer filed October 21, 1940, by the inventor.

Hereby enters this disclaimer to claims 1 and 7.

[*Official Gazette November 12, 1940.*]